United States Patent [19]

Achilles et al.

[11] Patent Number: 5,639,335

[45] Date of Patent: Jun. 17, 1997

[54] CUTTING PROCESS, DEVICE AND INSTALLATION FOR PRODUCING LAMINATES

[75] Inventors: Gerhard Achilles, Neustadt; Ernst Sturzenegger, Gossau; Alois Perberschlager, Zurich; Bruno Zümstein; Emil Messmer, both of St. Gallen, all of Germany

[73] Assignee: Ulrich Steinemann AG, St. Gallen, Switzerland

[21] Appl. No.: 472,842

[22] Filed: Jun. 7, 1995

Related U.S. Application Data

[62] Division of Ser. No. 150,069, filed as PCT/CH93/00081, May 23, 1993, published as WO93/18917, Sep. 30, 1993, Pat. No. 5,518,569.

[30] Foreign Application Priority Data

Mar. 24, 1992 [CH] Switzerland .................. 924/92
Feb. 5, 1993 [CH] Switzerland .................. 353/93

[51] Int. Cl.$^6$ ...................................... B26D 5/00
[52] U.S. Cl. ............... 156/353; 156/367; 156/310; 156/523; 156/250; 156/269; 83/37; 83/38; 83/73; 83/74
[58] Field of Search .................. 156/353, 367, 156/510, 523, 250, 269; 83/37, 38, 73, 74, 76, 298

[56] References Cited

U.S. PATENT DOCUMENTS

| 3,820,427 | 6/1974 | Stomph . |
| 3,901,112 | 8/1975 | Voswinkel . |
| 4,158,712 | 6/1979 | Degens . |
| 4,279,183 | 7/1981 | La Fleur . |
| 4,938,907 | 7/1990 | Vowes et al. . |
| 5,518,569 | 5/1996 | Achilles et al. ............ 156/250 |

FOREIGN PATENT DOCUMENTS

| 0084880 | 8/1983 | European Pat. Off. . |
| 0165824 | 12/1985 | European Pat. Off. . |
| 0235790 | 9/1987 | European Pat. Off. . |
| 0361259 | 4/1990 | European Pat. Off. . |
| 2409139 | 6/1979 | France . |
| 2567806 | 1/1986 | France . |
| 2615448 | 11/1988 | France . |
| 119369 | 7/1900 | Germany . |
| 455609 | 1/1928 | Germany . |
| 502976 | 7/1930 | Germany . |
| 3515784 | 11/1986 | Germany . |
| 1125539 | 8/1968 | United Kingdom . |

OTHER PUBLICATIONS

C. Wall, "The Move to Electronic Drive Shafts", Machine Design, vol. 57, No. 19, Aug. 1985, pp. 66–71.

*Primary Examiner*—Christopher Kim
*Attorney, Agent, or Firm*—Finnegan, Henderson, Farabow, Garrett & Dunner, L.L.P.

[57] ABSTRACT

To enhance printed products, lamination is to be carried out by of a controllable pair of laminating rollers, rather than by the conventional method of calender rolling. To do this, the film is applied with relatively low contact-pressure roller pressure in a floating manner. The film can be fed to the laminating rollers without tension by means of a controllable applicator mechanism with a film tension regulating device. The processing rate and sheet length, for example, can be entered by computer so as to control the sequence of the feeder output and also the sequence of a wet cutting device via a suitable incremental-value transmitter from the main drive. Accordingly, processing rates of 60 to 100 meters per minute can easily be set. The quality remains good even at the highest speeds.

26 Claims, 11 Drawing Sheets

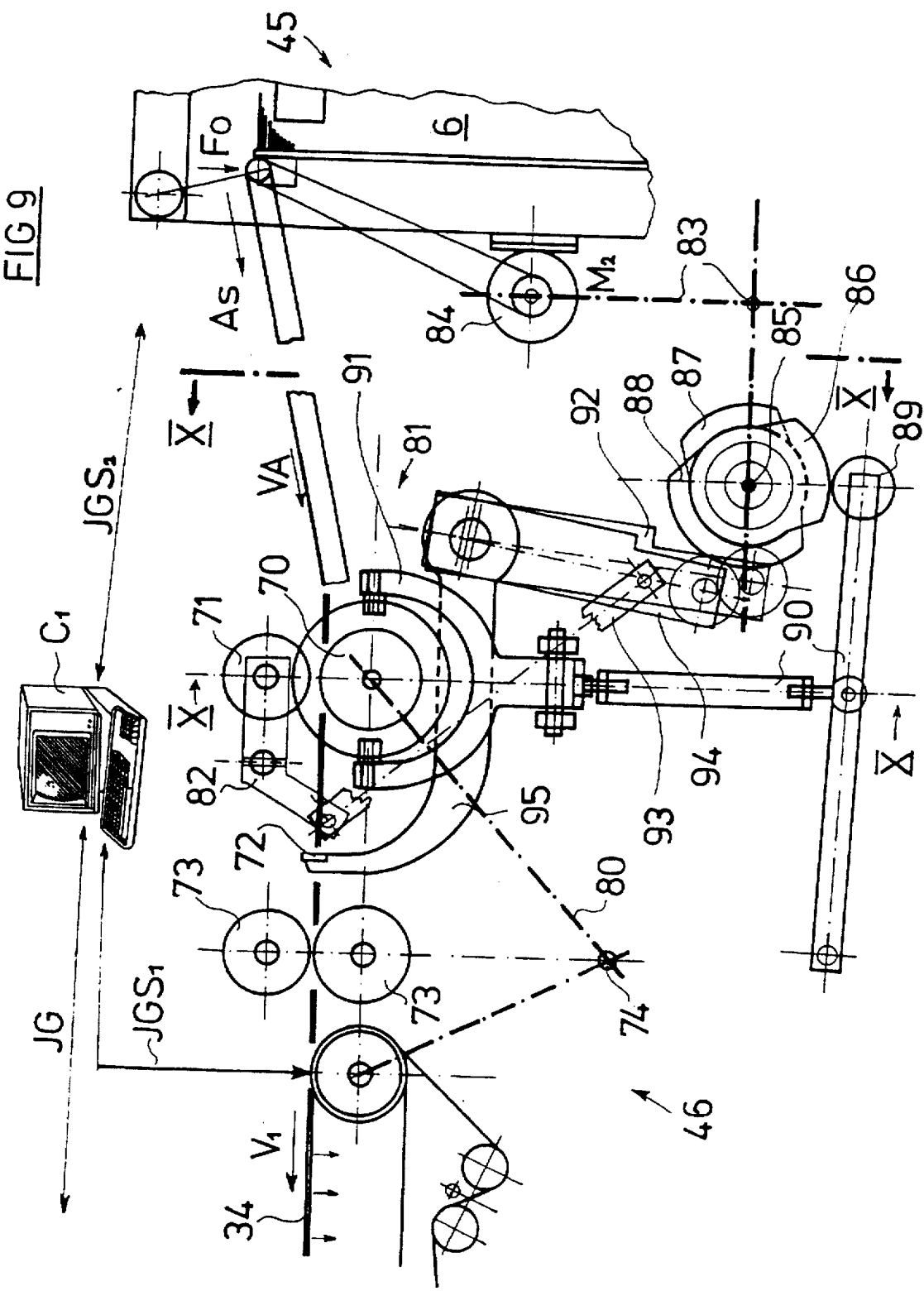

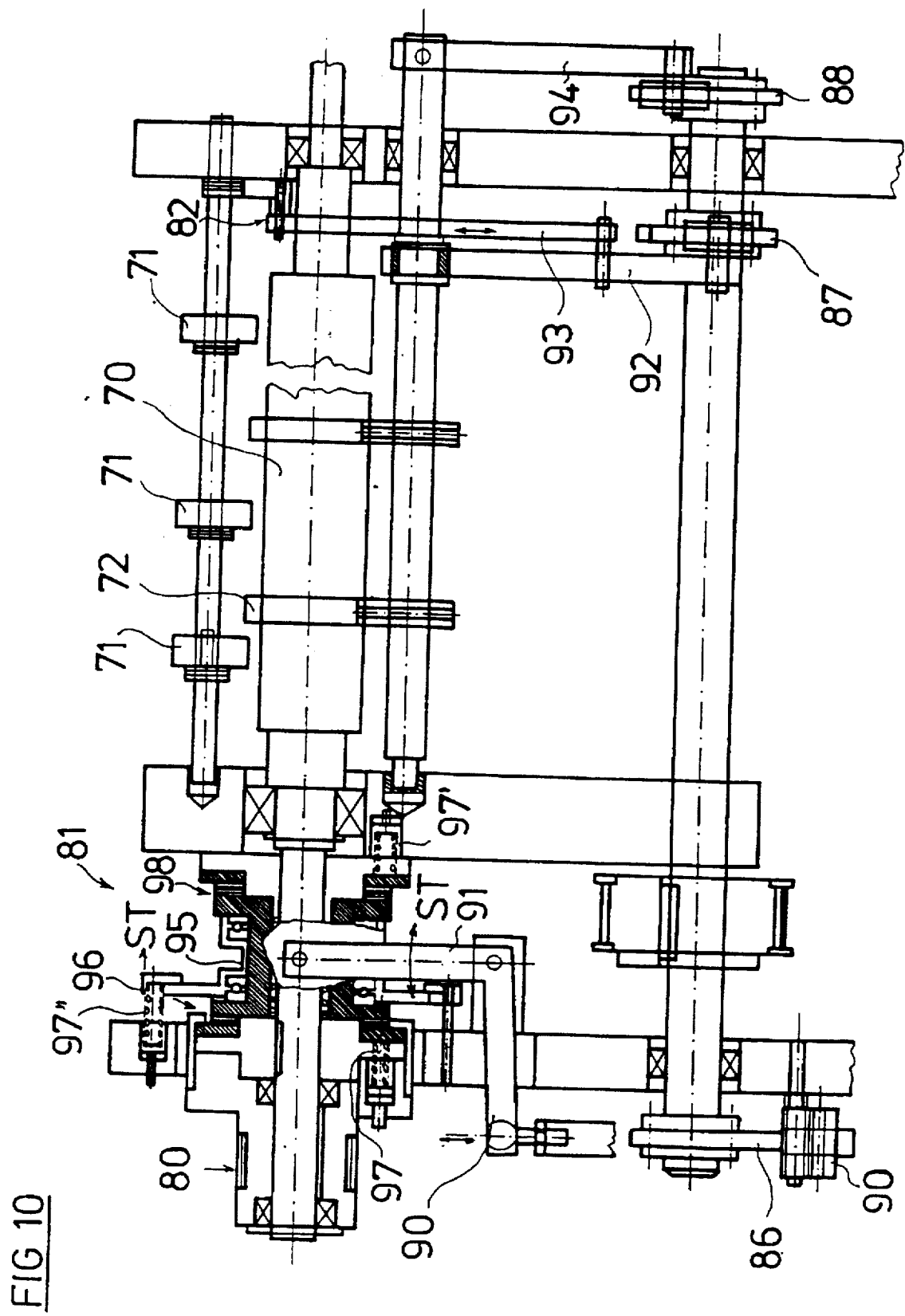

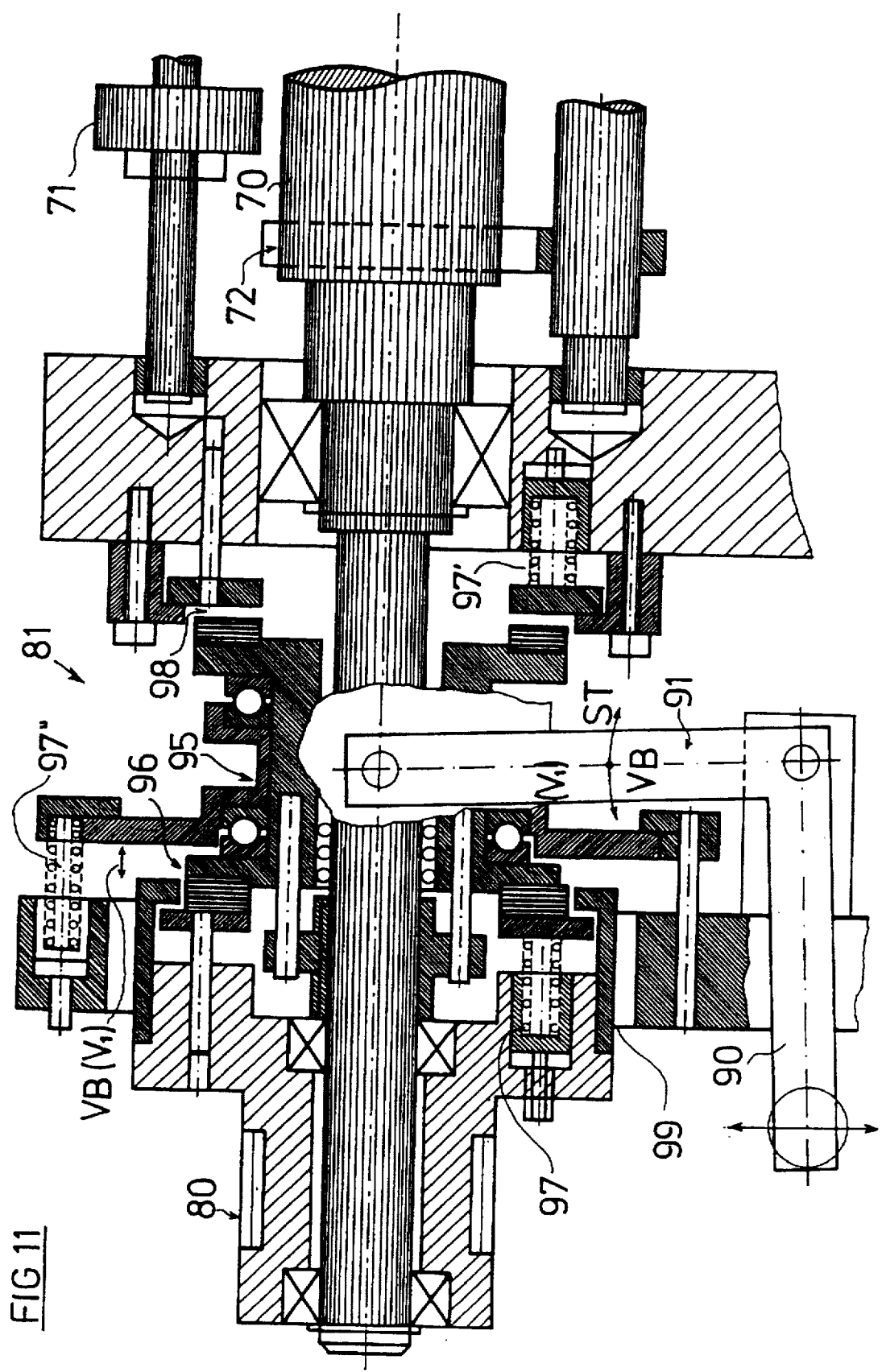

CUTTING PROCESS, DEVICE AND INSTALLATION FOR PRODUCING LAMINATES

This is a division of application Ser. No. 08/150,069, filed as PCT/CH93/00081, May 23, 1993, published as WO93/18917, Sep. 30, 1993, U.S. Pat. No. 5,518,569.

BACKGROUND OF THE INVENTION a) Technical Field

The invention is directed to a process, a device and an installation for the production of laminates, for example, laminates which can be hardened or cured by radiation, in which adhesive is distributed on a thin film and the film is combined with an individual sheet or a continuous sheet by means of a laminating machine to form a laminate. Such laminates are used particularly in advertizing media or in the packaging industry.

b) Background Art

The relatively thin film of plastic material is taken off from a roll in a continuous manner. When individual sheets are used, the sheets are taken from a stack. The film and sheet are fed together to the laminating machine as a laminate. In order to prevent soiling of the rollers in the laminating machine, the individual consecutive sheets are often overlapped in the edge region. The overlapped or underlaid sheets are coated with the film. However, it is also possible to laminate the sheets end to end. The individual sheets are joined with one another by the film after laminating. Before processing further in a subsequent working process, the laminate must be separated again into individual laminated sheets.

DE-PS 2 817 917 shows a known solution for the use of radiation-curable adhesives, so-called UV adhesives. This solution represented significant progress over conventional solutions in which the adhesive had to be dried over a relatively long period of time, partially by infrared rays and hot air. The laminate may sometimes take up to 24 hours to dry before further processing is possible. In the case of conventional adhesives, the processing speed of the known installations must be under 40 meters per minute, for example, since operating troubles would otherwise increase substantially. 60 meters per minute was formerly assumed as a "processing sound barrier", as it were.

When using adhesives which can be polymerized or cured by UV rays or electron rays, the adhesive need not be dried in the strict sense, but rather hardened or cured, which takes only fractions of a second. Immediately after curing, the UV laminated sheets can be stacked or stored on rolls without a loss in quality. This is a precondition for the continuous operating mode. Depending on the projected purpose, very different requirements are imposed on lamination, which in itself represents an enhancement of the base material.

In a first category of lamination, its principal purpose is to increase mechanical strength and protect the surface of the imprinted base material, which in this case may be imprinted paper or cardboard. Book jackets, picture portfolios, posters, etc. may be produced from the latter.

In a second category, lamination is required particularly for improving or enhancing the effect of colors or a print. The end product is a coated material which has been enhanced by a transparent film, e.g. for brochures or other advertisements and high-price art prints. This produces a glass-like effect. Any disturbing secondary effect such as very small air bubbles between the film and the base material, inadequately joined locations or striated effects in the applied coat must be avoided particularly where requirements are exacting, as in art prints and superior advertizing printing. The content of the print should be enhanced, but never disrupted by secondary results of lamination. On the contrary, any defects such as surface roughness should be concealed or covered prior to lamination. Accordingly, the visual impression is also subject to the most exacting requirements. In this regard, it is well known that the perceptive ability of the human eye is almost unsurpassed, so that these requirements border on near perfection.

It has recently been shown that a solution according to DE-PS 2 817 917 enables an optimal "protective lamination" with great success. On the other hand, this solution cannot be used commercially for "art lamination" in view of the high expectations associated with the latter, since very small disturbing effects simply cannot be avoided with sufficient operating dependability. Even very large-scale, lengthy investigations have not achieved the desired success, particularly also in the selection of specific adhesives, film materials, etc. From the vantage point of the characteristics of radiation-curable adhesive, the adhesive fastening is now no longer the chief factor hindering processing speed.

OBJECTS AND SUMMARY OF THE INVENTION

The present invention therefore as a primary object, the improvement of a process, device and installation, in particular with respect to operating reliability and the quality of the end product, even at the highest processing speeds so as to enable the production of radiation-curable laminates, for example, which also meet the most exacting demands in the way of "art lamination".

Another facet of this objective consists in improving the process and device in such a way that e.g. all laminating work can be carried out economically on the same manufacturing line with the aim of applying the film to the sheets with as few defects as possible or producing laminates for individual sheets and continuous sheets with as few defects as possible and also at a high processing speed. Further, it should be possible to produce an optional sheet sequence for the highest speeds without damaging the sheet, e.g. through the alignment station.

The solution according to the invention is characterized in that the film which is coated with adhesive is rolled onto the sheets in a "floating" manner without the use of pushing force, preferably with as little pulling force as possible.

In recent years complaints have already been voiced in technical circles that UV lamination is insufficient for achieving the highest quality in spite of its enormous advantages with respect to production technique, since all experiences seem to point in this direction. The present inventors were ultimately completely surprised by the discovery obtained on the basis of the insight that precisely UV lamination has heretofore been approached in an inadvisable manner for achieving the highest processing speeds, particularly with respect to physical laws. The first fundamental misjudgment consisted in the attempt to handle UV lamination as analogous to common adhesive paper. Experience with traditional gluing has shown that after wetting the adhesive coat and applying the substrate carrying the adhesive coat to another object, e.g. as when sealing an envelope, the adhesive connection takes effect immediately in the manner of "instant glue" and there is a risk of damaging the surface when this adhesive coat is detached, even shortly thereafter. Obviously, this overlooks the fact that radiation-curable adhesives such as UV adhesives behave in a completely different manner in this respect. That is, UV adhesives do not work in that the wetting agent of the adhesive penetrates immediately into the base material and produces an adhesive effect because of the dryness caused by this, but rather in that the adhesive is cured or hardened by utilizing the effect of UV radiation. The radiation-curable adhesives are definitely not glues in the traditional sense (which immediately invoke associations of stickiness), but rather have a characteristic, rather oily effect before hardening, roughly comparable to lubricating oil. Thus, if a thin pane of glass is laid on a flat surface with an intervening fine layer of lubricating oil, the glass can be moved parallel to the surface almost without applying force.

This insight made it possible to arrive at an essential point of the invention and, conversely, to grasp the reason behind many of the past failures. The chief error was that UV lamination was formerly carried out by conventional calender rolling. It is precisely in "high-gloss lamination" that the film has a primarily optical function and should therefore be as smooth as possible. It is well known that a pair of calender rollers exerts high forces to extricate the material from the adhesive and frictional forces proceeding from the calender pressing. In conventional lamination, the drawing-in effect and the corresponding high draw-in forces are required for rolling the viscous, sticky adhesive onto the rough surface of the sheet, but also in particular to draw off the laminate from the untreated or base film roll and drag it through the glue. In contrast, according to the novel invention, the film with the radiation-curable adhesive applied to it is applied to the sheet in a "floating" manner, similar to the glass placed on the surface with an intervening layer of lubricating oil. When a UV laminate is calender-rolled, excessive displacing forces necessarily act between the film and sheet. This results, among other things, in displacement, distortion, striation, and uneven joining of parts. Formerly, this was the reason for almost all unsightly defects in lamination with radiation-curable adhesives. On the other hand, when pushing forces were eliminated and pulling force on the laminate was minimized, defect-free products could be produced to the surprise of all concerned with a quality which could not previously be achieved.

Further, the invention allows a number of additional very advantageous further developments. The film is preferably rolled between the rollers with a low pressing force, preferably less than 100 N/cm, and particularly advantageously less than 10 to 50 N/cm. This means that the effective pressure forces for laminating lie in the order of magnitude of 50 to 200 kg, that is, not much more than those used previously when the sheet was coated with glue by hand or in a simple hand-operated press. The order of magnitude of these pressing pressures is reduced by a factor of 10 compared with traditional calender rolling.

The rolling is preferably effected by means of two driven laminating rollers and by a combination of belts. The lower supporting roll or laminating path is regulated for the purpose of a substantially identical guidance speed of the sheet and film. The thin base film is drawn off from a roll and the wet adhesive is applied via the applicator roller. The film is then fed to the laminating roller smoothly, or at least with as little tension as possible, and laminated with the sheets. The base film roll is positioned in front of the laminating rollers in such a way that the film is drawn off and guided up to the adhesive applicator mechanism via a contact pressure roller. The film which is coated with wet adhesive is then guided into the laminating roller pair via a tension compensating roll. The tension compensating roll is preferably constructed as a measurement roll with the important function of minimizing the tensile forces on the film between the applicator mechanism and the laminating roller pair.

According to a further particularly advantageous construction, the film is cut while wet immediately after the laminating rolling for reproducing individual sheets. Very good results have been achieved in that the film is cut by means of a moving thermal cutting knife which extends along the entire width of the laminate.

For special applications, it is possible to subject the film coated with wet adhesive to an adhesive stabilization or activation prior to lamination, if necessary, and to cure it after lamination. In this respect, reference is made to DE-PS 3 665 726 which is declared as a component part of the present patent application in its full scope.

The unprocessed sheets are advisably stored at one end of an installation and guided substantially horizontally along the processing line to the other end of the installation, and the coating and feed of the film are effected above the processing line. The film is fed downward onto the sheet in such a way that the film and sheet are guided without tension at the rotating speed of the two laminating rollers.

The device or installation has a laminating machine with a film roller and sheet roller as well as sheet and film advancing means and is characterized in that both the film roller and sheet roller have drive means which can be controlled and/or regulated and constructed for a substantially identical guidance speed for the film and sheet and the film advancing means is constructed as a film guiding mechanism which can be regulated with respect to film tension force. The film roller is preferably constructed as a regulating control roller from which the main functions of the entire installation are coordinated. For this purpose, an incremental transmitter of the film roller or of the drive system of the film roller provides a basic control parameter for all feed operations.

In another development of the process, according to the invention, radiation-curable adhesive, preferably adhesive which can be polymerized by UV rays or electron rays, for example, is distributed on a thin film via an applicator roller and the film is combined with individual sheets or an endless sheet by means of laminating rolling to form a laminate and is characterized in that the film, after being coated with the adhesive, is guided via a tension measuring roller which is preferably free of displacement and is tightened with minimal force and brought up to processing speed by corresponding adjustment of the applicator roller speed. According to another preferred development of the process for proportioned continuous application of adhesive to a film with an applicator roller and a proportioning roller, the amount of adhesive is pre-proportioned in excess amounts via the proportioning roller and applicator roller and only adjusted to the desired amount of applied adhesive via a second adjustable removal device. In a particularly preferred manner, the excess adhesive is removed by a distributing roller whose speed can be adjusted independently. The excess adhesive can be reused. But the excess adhesive can also be removed by an adjustable wiper. The adhesive is proportioned in excessive amounts to form a flood and the flood is kept at a constant level by overflowing over a lateral wiper. It has proven very advantageous that the contact pressure force of the contact pressure roller be adjustable independently of the rolling force between the applicator roller and proportioning roller and/or independently of the effective force of the removal device. The tensile stress of the film coated with adhesive is regulated downstream of the adhesive application. For this purpose, the film is guided via a measuring roller after the adhesive is applied. The measuring roller regulates the feed rate of the film to the adhesive application via a force measuring means which is preferably free of displacement. The rotating speed of the applicator roller and/or the proportioning roller is preferably regulated as a function of the force measured by the measuring roller. The speed of the applicator roller is controlled on the basis of the rotating speed of the film roller. The proportioning of the adhesive can be pre-adjusted via the speed of the proportioning roller and regulated via the distributing roller and an adjustable wiping blade.

A further development for producing a sequence of individual sheets on a sheet feed belt for a processing process for a laminating or lacquering installation or for printing machines, for example, is characterized in that the effective processing rate is established, the sequence of the feeder output is determined via computer, and the sheet run is produced via controlled mechanical means.

The mechanical means preferably include sheet transporting means which are controlled as a function of the processing rate and sheet engaging means which are controlled as a function of the feeder output. The sheet transporting means are driven as a function of the sheet feed belt and the sheet engaging means are driven on the basis of the feeder. Damage to the surface of the sheet due to pressure, scratching or friction can be avoided if the sheets are accelerated smoothly to the processing rate from a feed rate (VA) via the mechanical means.

A further development for the production of a precise sheet sequence, e.g. an overlapping or underlaying or spaced or end-to-end sequence, and further transport of same at optional processing speed is characterized in that the sheets which are fed continuously with a large degree of overlap are accelerated at less than 4 g, preferably less than 2 g, via an accelerating roller with guide rolls.

In a particularly preferred manner, the sheets are accelerated smoothly to the processing speed along a distance of less than half the length of the sheet. The subsequent sheet is stopped by a stop and the paired rollers are backed away from one another during the stopping period.

The pair of rollers is preferably engaged at an optional time selected in dependence on the length of the sheet and the rollers are accelerated together with the sheet until reaching the laminating speed.

It is suggested that the accelerating distance be kept as small as possible. In most cases, the selected accelerating distance is 0.1 to 10 times longer, preferably 2 to 6 times longer, than the overlapping or underlaying. However, in extreme cases, it may also be in the range of 0.1 to 1, particularly when there are very slight differences in speed or very low speeds.

According to another advantageous design idea of the process according to the invention for separating a laminate made from a web-shaped film coated with adhesive and from individual sheets joined together by means of the coated film, the laminate is guided past a cutting station continuously from a laminating machine. The cutting station is arranged between the laminating machine and an adjoining laminate bonding station and the film is cut when wet, preferably with a thermal cutting knife. The cutting mechanism is guided at roughly the same speed as the laminate for cutting and moves in a reciprocating manner on the laminate. Clean cuts can be achieved even at extremely high cutting rates in that the laminate is supported via a flexible support for cutting the film, preferably via an endless belt which supports at the beginning and end of the cutting region and moves along with the laminate at the same speed. The endless belt can be constructed as a suction belt so that the laminate is drawn through the cutting region by the suction. The cutting mechanism is preferably constructed as a revolving knife mechanism and the rotating speed is regulated via computer in such a way that the knife mechanism is accelerated to the speed,of the laminate for each cut as a cutting cycle, moved along with the laminate at approximately the same speed during the cut, and then slowed to a lower speed. In a particularly advisable manner, the knife mechanism passes through a zero point or calibrating point in the lower speed range for monitoring movement as a starting point for calculating the next cycle. The knife mechanism preferably has only one thermal cutting knife. Each cutting cycle can correspond to a complete revolution of the knife mechanism. For this purpose, the zero position is selected in the upper quadrant of the revolving movement.

According to another design idea, the adhesive which is applied to the film is stabilized or activated, if necessary, prior to laminating and is advanced for curing after laminating.

The construction of the device is referred to in the following. A first construction of the device for producing laminates made from a thin film and individual or continuous sheets where the laminate is connected by radiation-curable adhesive has a laminating machine with film roller and sheet roller as well as a sheet and film advancing means and is characterized in that both the film roller and the sheet roller have drive means with which a regulating device is associated so that the guidance speeds of the film and sheets are substantially identical and the film advancing means is preferably constructed as a film guiding mechanism with adjustable film tension force.

According to another advantageous construction, the film roller is constructed as a control roller which controls or regulates the application of adhesive and/or a cutting station and/or a sheet overlapping station via a corresponding incremental transmitter.

A further advantageous construction of the device for proportioning the continuous application of adhesive on a film with an applicator roller and a proportioning roller is characterized in that an independently adjustable adhesive removal device which is preferably constructed as a proportioning roller and further, in a particularly preferred manner, an independently adjustable contact pressure roller are associated with the applicator roller. Speed control means which work particularly on the basis of a processing rate of the film in the adjoining processing installation or on the basis of a corresponding incremental transmitter signal are associated with the applicator roller as basic controlling means. The speed control means of the applicator roller is subordinated to a speed regulator which works as a function of the tensile stress of the film coated with adhesive. An applicator roller and a proportioning roller can form a first adjustable roller pair and the applicator roller and a distributing roller can form a second adjustable roller pair. Further, a contact pressure roller which can exert contact pressure independently of the proportioning roller is associated with the applicator roller.

According to another design of the device for separating a laminate made from a web-shaped film coated with adhesive and from individual sheets joined by the coated film, the laminate is guided past a cutting station from the laminating machine in a continuous manner. This is characterized in that the cutting station has a cutting knife which moves along at the speed of the laminate, computers, and a speed regulating drive of the cutting mechanism which is preferably constructed as a thermal cutting knife with revolving knife mechanism and preferably has a zero position sensor in an upper deceleration or rest range.

Another particularly advantageous construction of the invention for producing a sequence of individual sheets on a sheet feed belt for a processing process, for example, for a laminating installation with a controllable sheet feeder is characterized in that it is controllable via computer means which are functionally linked with an actual-value receiver for the processing rate, preferably with an incremental transmitter, as well as a mechanically controllable sheet sequence generating device or aligning station.

The aligning station preferably has drive means on the feeder side as well as on the processing process side. The aligning station advisably has an accelerating roller and control means for driving the accelerating roller which is preferably drivable on the processing process side.

According to another construction, engaging and disengaging guide rollers and a controllable stop are associated with the accelerating roller. The engagement and disengagement and the stop are preferably controllable in a coordinated manner by the drive means of the feeder. The acceleration roller pair is preferably drivable via a controllable slip clutch and the slip clutch is constructed with a dual function for smooth acceleration on the one hand and for a deceleration or braking of the accelerating rollers on the other hand.

In another construction, the slip clutch is arranged on a center sliding bush and the acceleration coupling or brake coupling is arranged diametrically opposite the latter in such a way that the slip clutch can be actuated via mechanical means.

The invention will now be explained in more detail in the following with reference to a number of embodiment examples.

BRIEF DESCRIPTION OF THE DRAWINGS

FIG. 9 shows the control arrangement for the sheet alignment;

FIG. 10 shows a cross section X—X of FIG. 9;

FIG. 11 is an enlarged view of a mechanical accelerating and braking coupling;

DESCRIPTION OF THE PREFERRED EMBODIMENTS

Figure 1:
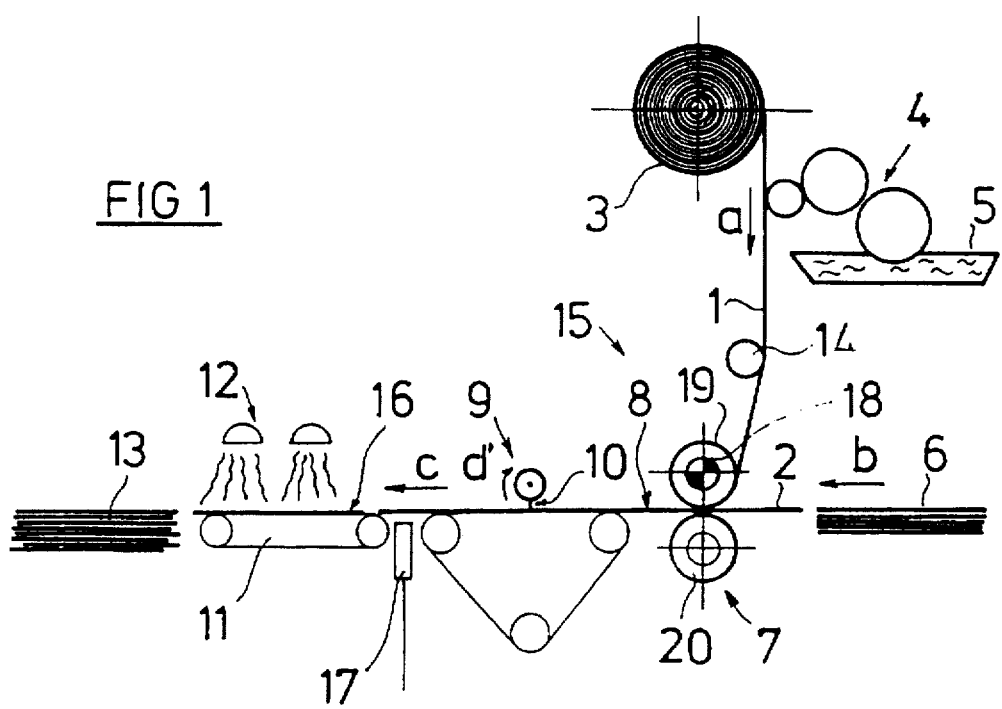
FIG. 1 is a schematic view of a laminating installation.

FIG. 1 is referred to in the following. The cutting station 9 has a thermal cutting knife 10 on the film side which is fastened to a blade rail and extends along the entire width of the laminate. The blade rail rotates in arrow direction d, i.e. in the same direction as the feed direction c of the laminate 8. In so doing, the cutting knife 10 describes an orbit. The cutting knife 10 preferably has an electric wire or a fine metal strip which can be heated by electrical resistance.

A light barrier or other suitable measurement transmitter 17 for detecting the front edge of a laminate portion is arranged downstream of the cutting station 9 in the feed region of the laminate 8. A somewhat higher rate of speed at the transporting device 11 ensures that the severed laminate portions 16 are immediately withdrawn and that an intermediate space is formed between the individual laminate portions 16. The distance traveled by the laminate portions 16 is determined, for example, by an incremental transmitter 18 at the laminating roller pair 7. The subsequent cutting process is controlled or regulated on the basis of the determined values transmitted by the transmitters 17 and 18 and as a function of the sheet positions entered into the control device. FIG. 1 is a purely schematic view of the process of lamination of individual sheets with a film 1 in a laminating machine 15. The film 1 is taken off from a base film roll 3 in arrow direction a as an endless web and coated on one side with a liquid adhesive. The adhesive 5 is applied and distributed via an applicator mechanism 4. This can be an adhesive that can be polymerized by UV radiation.

The film 1 which is coated with adhesive is then fed to the laminating rollers 7. The individual sheets 2 are removed from a stack 6 and guided into the roller gap of the laminating rollers 7 one after the other in arrow direction b by means of a sheet feeder. The endless laminate 8 formed in the laminating rollers is separated by the cutting knife 10 of the cutting station 9 to form laminate sheets, only the film 1 being severed entirely. The laminate portions 16 are then transported in arrow direction c to a transporting device 11 on which they pass through a curing station 12 in which the adhesive is cured by UV rays. The laminate portions 16 are then placed on a laminate stack 13. The laminating rollers 7 include an upper film roller or mother roller 19 and a bottom sheet roller or counter-pressure roller 20. Of course, the installation could also be designed for other adhesive connections. Solvent-containing adhesive, dispersion adhesives or even pre-coated films could be used for this purpose. Depending on the type of adhesive that is used, the curing station 12 downstream of the cutting station 9 could be dispensed with and a drier could take its place upstream of the laminating rollers 7. The cutting station 9 could also be arranged subsequent to the curing station. However, the process according to the invention allows the severing of the film to be carried out in the wet state immediately after exiting from the laminating roller pair. In certain cases it is advantageous that the laminate 8 be wound up first on a roll and to divide up the roll at a later time in a separate device for individual portions 16.

Figure 2:
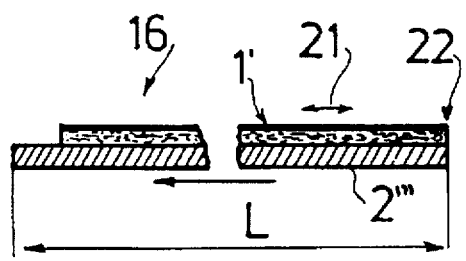
FIG. 2 shows a laminated sheet with sheet length L.

FIG. 2 shows an individual laminate portion 16 with an exaggerated thickness D and a length L. The sheet 2" can be a paper sheet or cardboard sheet. The film 1' is generally transparent plastic. The sheet and film are joined by means of an adhesive coat 5'. As long as the adhesive, in this case a radiation-curable adhesive, is not yet cured, the film 1' can be displaced relatively easily relative to the sheet 2'" in the direction of arrow 21. This is undesirable for a number of reasons. For example, it is disadvantageous for continued processing when a film edge, indicated by 22, projects over the sheet 2'".

Figure 2A:
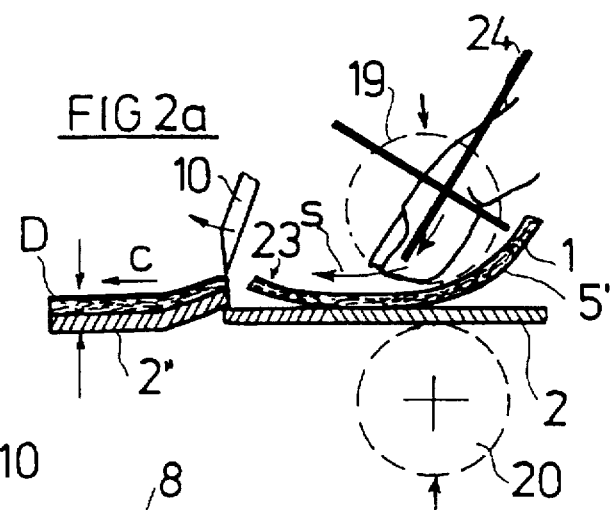
FIG. 2a is a very simplified view of the previous play of forces in lamination.

The invention aims at a lamination of the film without tension, that is, joining the film to form a laminate with as little tension as possible. Many tests have shown that the projecting tear-off edge 23 (FIG. 2a) which occurs when cutting in the wet state lays down immediately and the adhesive connection after curing has an almost uniform quality along the rest of the connecting locations. Further, FIG. 2a shows the actual lamination, again in an exaggerated manner to facilitate understanding, by means of the laminating roller pair 7 and film roller 19 and the sheet roller and counter-pressure roller 20 shown in dashed lines. A pushing force "S" from right to left on the film 1 is represented by an index finger 24 over the film roller 19. The index finger 24 is marked by two crossed lines to indicate that a corresponding pushing force "S" is not supposed to occur, since ungovernable forces, stresses, etc. would otherwise be transmitted to the laminate.

Figure 3A:
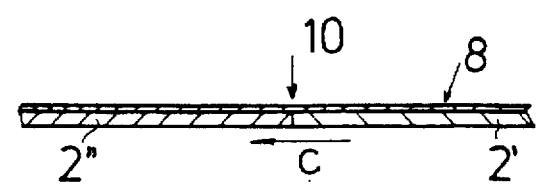
FIG. 3a shows an end-to-end sheet sequence.
Figure 3B:
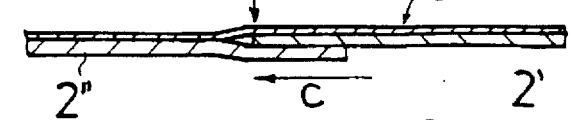
FIG. 3b shows the overlapping, known per se.
Figure 3C:
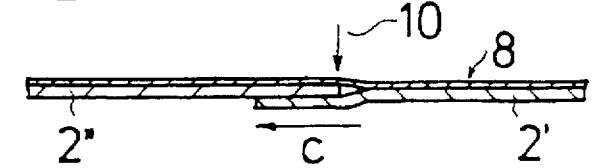
FIG. 3c shows the underlaying, known per se.

The laminate 8 is shown end-to-end in FIG. 3a, overlapped in FIG. 3b, and underlaid in FIG. 3c with an optional cutting effect of the cutting knife 10 in each instance for severing the laminate.

Figure 4:
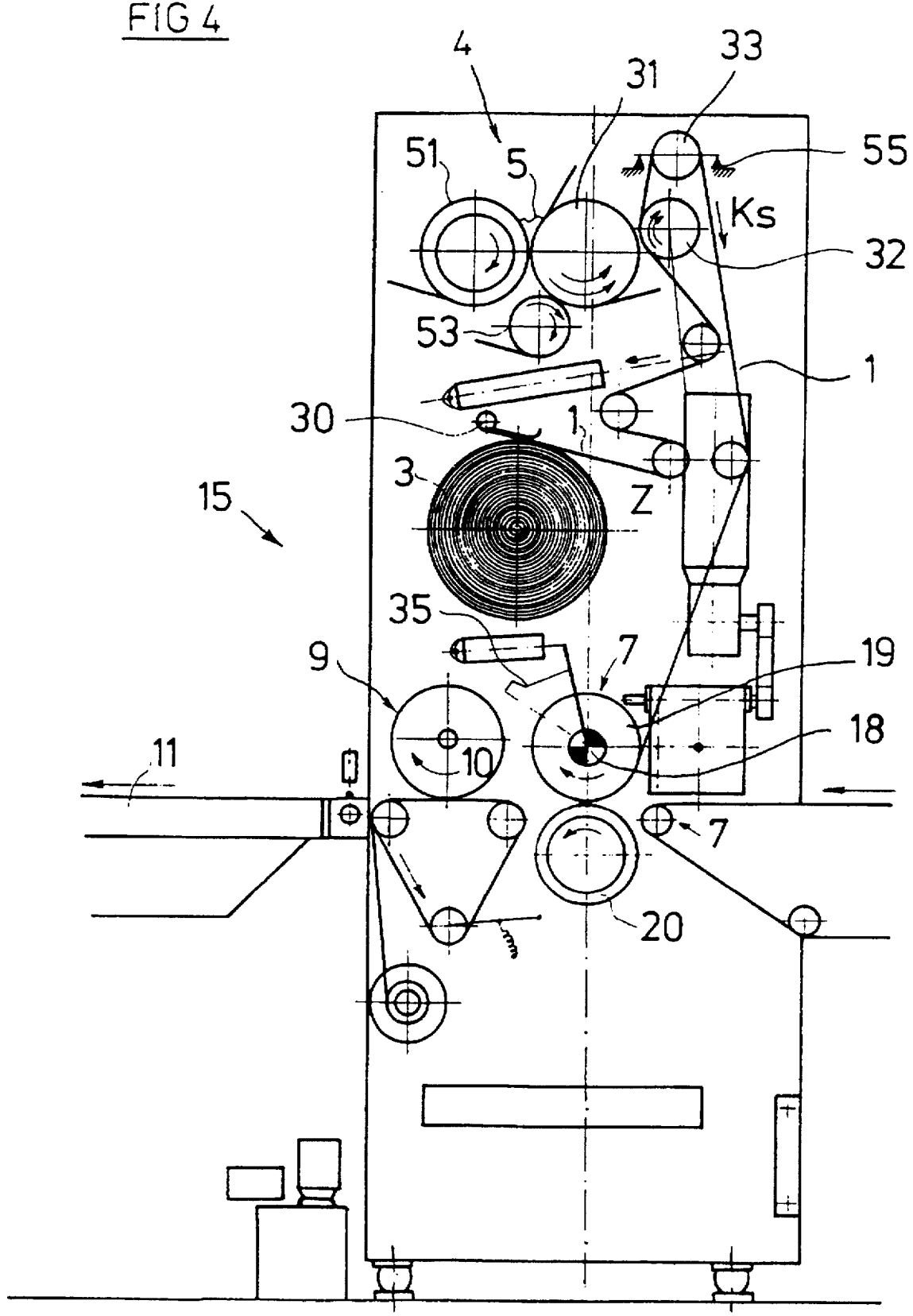
FIG. 4 is a concrete view of an applicator and laminating mechanism.

FIG. 4 shows a concrete view of the laminating machine 15. The base film 1 is drawn off from the base film roll 3 by a braking device 30 which is not driven, but acts with a slight restraining force. This produces a varying tensile force "Z" generated by an applicator roller 31 and a contact pressure roller 32 which can press against the latter. The applicator roller 31 is controlled by the incremental transmitter 18 of the film roller 19. The film is guided around a measuring roller 33 which overdrives the speed of the applicator roller 31 and regulates it to the desired circumferential speed based on a tension measurement value so that the film 1 provided with the adhesive can be adjusted to a minimum tensioning force Ks. A sheet feed table 34 is likewise adjusted to the effective circumferential speed of the film roller 19 so that the sheet and film are guided into the laminating roller pair 7 at the same speed. In so doing, the film 1 has only enough tension so that the film is tight, but not pulled. The laminating rollers 7 have a bearing 35, known per se, so that the axial distance can also be increased temporarily with correspondingly low forces for the thicker overlapping part.

Figure 5:
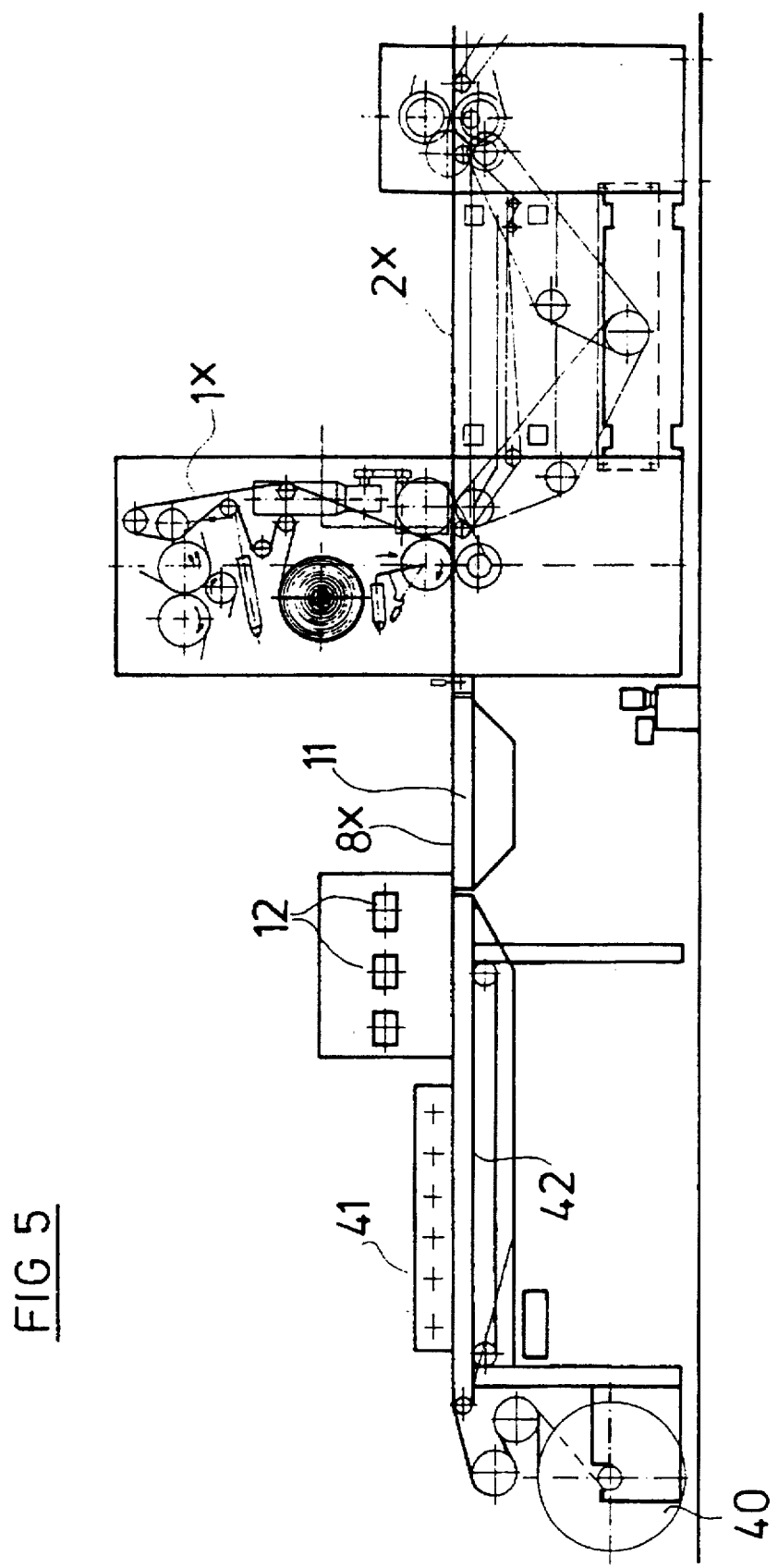
FIG. 5 shows a laminating installation.

FIG. 5 shows an installation for the production of endless sheets. The film 1* and the sheets 2* are fed continuously. The laminate 8* which is also continuous is rolled up on a laminate roll 40. Further, a cooling station 41 is arranged above a conveyor belt 42 downstream of the curing station 12 in FIG. 5.

Figure 6:
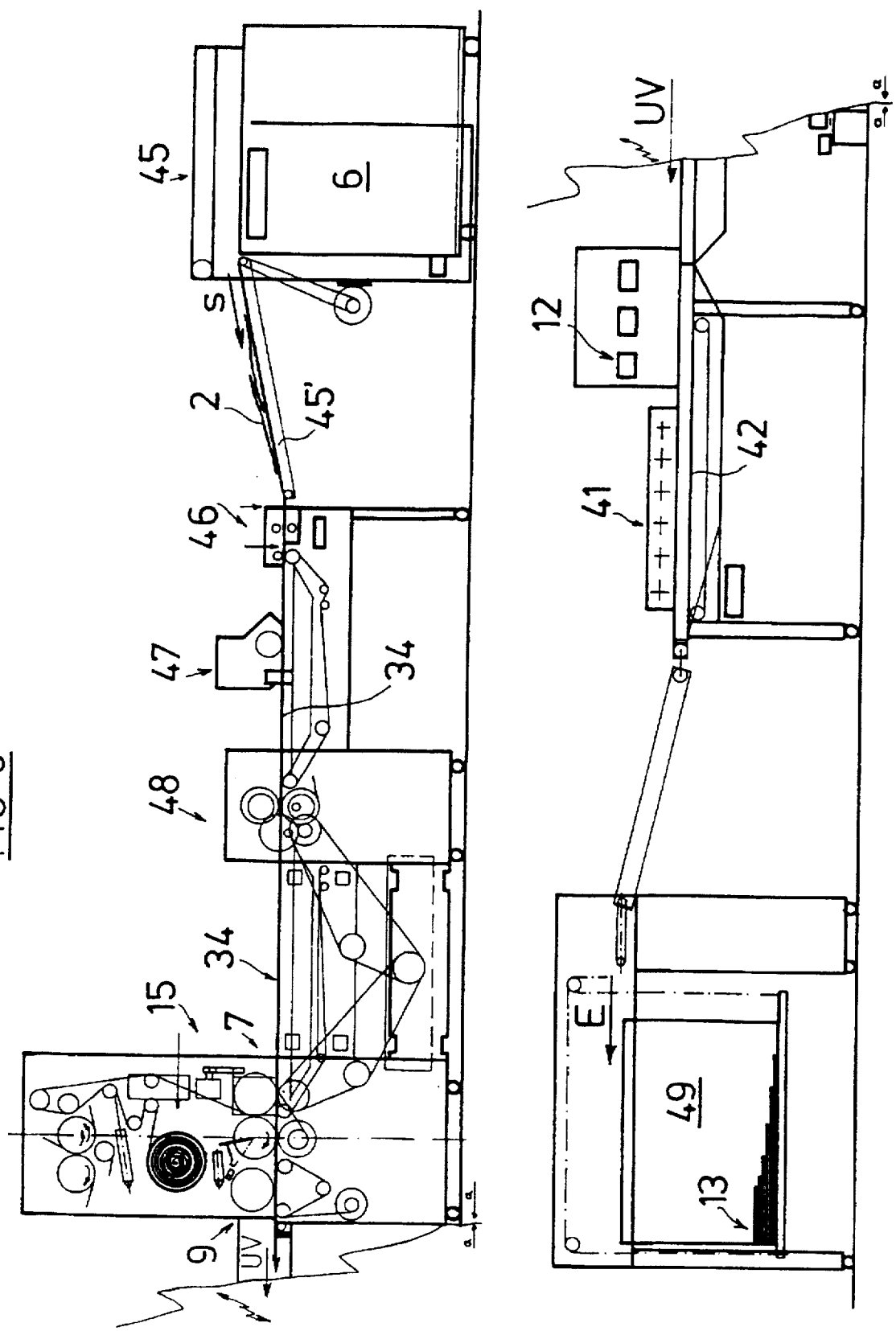
FIG. 6 shows an entire laminating installation in two parts.

FIG. 6 shows a complete installation for laminating individual sheets, shown in two halves. The unprocessed sheets 2 are transferred by means of a feeder 45 from a sheet stack 6 to an aligning station 46 from which the sheets are then fed in the desired overlapping or underlaying to a cleaning brush 47 and then to a pressing and cleaning calender 48 for pressing the sheets 2 smooth. Following the laminating station 15, the cutting station for glue bonding 12, and the cooling station 41 for the cured sheets, there is a depositing receptacle 49 in which the finished sheets are stacked in a laminate stack 31.

Figure 7:
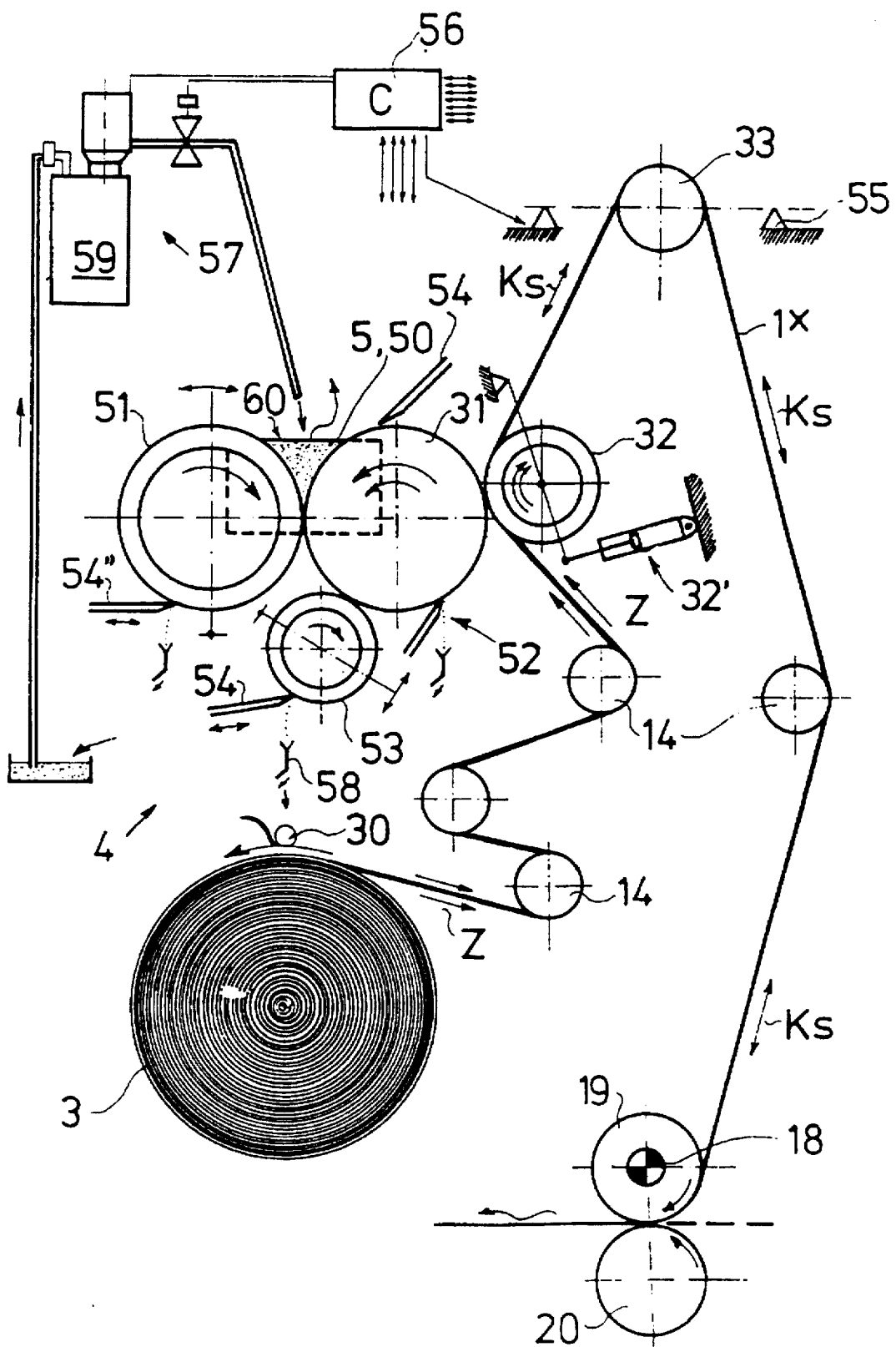
FIG. 7 shows the main elements of the applicator mechanism.

The applicator mechanism 4 is shown in an enlarged view in FIG. 7. The adhesive 5 is shown here as a flooding 50 in the feed gap of the applicator roller 31 and proportioning roller 51. The applicator roller 31 is preferably made from steel, but the proportioning roller is provided with a rubber jacket. The speed of the applicator roller 31 is controlled as a function of the incremental transmitter 18 of the film roller 19. The proportioning roller 51 which rotates considerably more slowly (one arrow) is governed according to the desired speed of the film 1 as well as according to the desired thickness of the applied coat of adhesive. Since the applicator roller 31 rotates faster (two arrows) than the proportioning roller 51, the adhesive film remains on the applicator roller 31. However, the selected thickness of the adhesive coat is deliberately greater than the desired thickness to be applied to the film 1. The excess adhesive can either be removed by am adjustable wiper 52 or by a distributing roller 53 whose speed is adjustable independently. In the case of the adjustable wiper 52, this is effected by the gap thickness. In the case of the distributing roller it is effected by varying the speed and/or the proportioning distance. Depending on the defined purpose, cleaning wipers can be used on all rollers, e.g. also for defining the application of adhesive laterally. However, it is important that the speed ratio of the applicator roller 31 to the proportioning roller 51 be adjustable independently, as well as the contact pressure or proportioning gap between the applicator roller 31 and the distributing roller 53.

Further, it is important for optimal application of adhesive that the contact pressure roller 32 has means 32' for pressing the contact pressure roller 32 against the applicator roller 31 independently of the "adhesive rollers" (the applicator roller 31, the proportioning roller 51, and the distributing roller 53). The contact pressure roller 32 is preferably not driven by a motor. In this way, each partial function may be optimized independently. The measuring roller 33 is preferably supported on force measuring bearings 55 which are free of displacement. In addition, a computer-supported (56) regulating device regulates the rotating speed of the applicator roller 31 to a determined preselectable tensioning force Ks of several hundred grams, for example, so that the film can be guided into the laminating means without pulling. The computer 56 can also give the rest of the control commands, e.g. for the adhesive proportioning and recycling station 57. All excess adhesive is directed into the adhesive tank 59 again via corresponding collecting hoppers 58 via a pump line. The flood 50 can overflow the applicator roller 31 and proportioning roller 51 via a lateral wiper 60. This surplus is also guided back to the adhesive tank 59.

Figure 14:
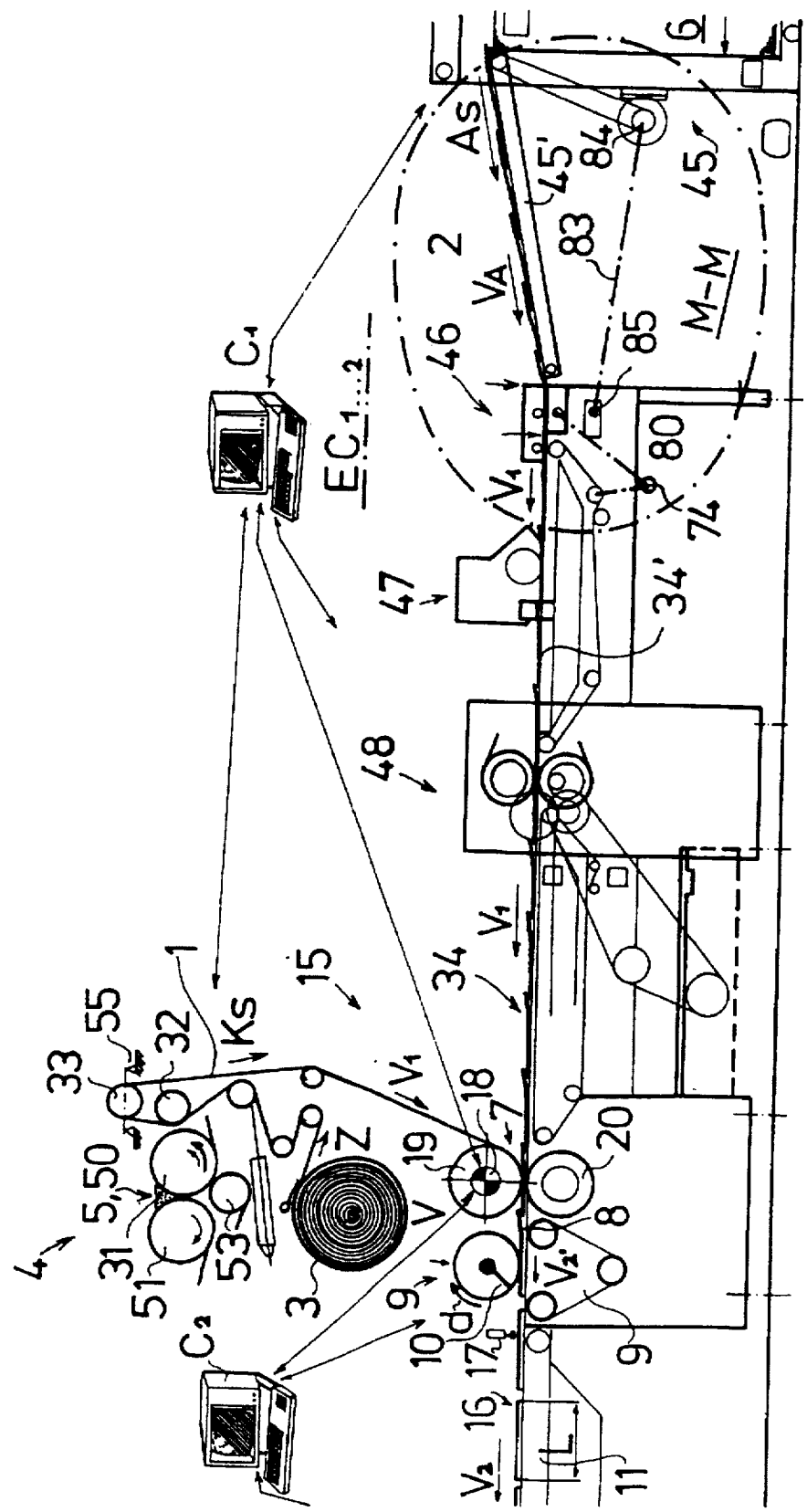
FIG. 14 is a schematic view of the production of a laminate and individual laminate sheets made from the latter.

FIG. 14 is referred to in the following. FIG. 14 is a purely schematic diagram of the process for laminating individual sheets with a film 1 in a laminating machine 15. The film 1 is taken off from a base film roll 3 as an endless web and is coated on one side with a liquid adhesive. The adhesive is applied and distributed via an applicator mechanism 4. This may be adhesive which can be polymerized by UV rays. The film 1 coated with the adhesive is then fed to the laminating rollers 7. The individual sheets 2 are removed from a sheet stack 6 and likewise guided one after the other in arrow direction (VA, V1) into the roller gap of the laminating rollers 7 by means of a sheet feeder 45. The endless laminate 8 formed in the laminating rollers is divided into laminate portions 16 by the cutting knife 10 of the cutting station 9 and only the film 1 is severed. The laminate portions 16 then arrive on a transporting device 11 on which they pass through a curing station 12 and the adhesive is cured by means of UV rays. The laminate portions 16 are then placed on a laminate stack 13 (FIG. 6). The laminating rollers 7 include an upper film roller or mother roller 19 and a bottom sheet roller or counter-pressure roller 20.

The cutting station 9 has a thermal cutting knife 10 on the film side which is fastened to a blade rail and extends over the entire width of the laminate 8. The blade rail rotates in arrow direction d, that is, in the feed direction of the laminate 8. The cutting knife describes an orbit. The cutting knife 10 is preferably an electric wire or a fine metal strip which can be heated by electrical resistance. A light barrier or other suitable measurement transmitter 17 which can detect the front edge of the laminate portion is arranged downstream of the cutting station 9 in the feed region of the laminate 8. A somewhat higher rate of speed at the transporting device 11 ensures that the severed laminate portions 16 are immediately withdrawn and that an intermediate space is formed between the individual laminate portions 16. The speed of the laminate 8 is determined, for example, by means of an incremental transmitter 18 at the laminating roller pair 7. The subsequent cutting process is controlled or regulated on the basis of the determined values transmitted from the transmitters 17 and 18 and as a function of the sheet positions which have been entered in the control device beforehand. The invention aims at a lamination of the film without pushing forces and with as little pulling as possible, that is, joining the film to form a laminate with as little tension as possible. Many tests have shown that the projecting tear-off edge 23 which occurs when cutting in the wet state lays down immediately and the adhesive connection after curing has an almost uniform quality along the rest of the connecting locations.

Of course, the installation could also be designed for other adhesive connections. Solvent-containing adhesive, dispersion adhesives or even pre-coated films could be used for this purpose. Depending on the type of adhesive that is used, the curing station 12 (FIG. 6) downstream of the cutting station 9 could be dispensed with and a drier could take its place upstream of the laminating rollers 7. The cutting station 9 could also be arranged subsequent to the curing station. However, the process according to the invention allows the Severing of the film to be carried out in the wet state immediately after exiting from the laminating roller pair. In certain cases it is advantageous that the laminate 8 be wound up first on a roll and to divide up the roll at a later time in a separate device for individual portions 16.

The uncoated film 1 is drawn off from the base film roll 3 by a braking device which is not driven, but acts with a slight restraining force. This produces a varying tensile force "Z" generated by an applicator roller 31 and a contact pressure roller 32 which can press against the latter. The applicator roller 31 is controlled by the incremental transmitter 18 of the film roller 19. The film is guided around a measuring roller 33 which overdrives the speed of the applicator roller 31 and regulates it to the desired circumferential speed based on a desired tension measurement value so that the film 1 provided with the adhesive can be adjusted to a minimum tensioning force Ks. A sheet feed table 34 is likewise adjusted to the effective circumferential speed of the film roller 19 so that the sheet and film are guided into the laminating roller pair 7 at the same speed. In so doing, the film 1 has only enough tension so that the film is tight, but not pulled. The laminating rollers 7 have a bearing, known per se, so that the axial distance can also be increased temporarily with correspondingly low forces for the thicker overlapping part. The proportioning roller 51 which rotates considerably more slowly (one arrow) is governed according to the desired speed of the film 1 as well as according to the desired thickness of the applied coat of adhesive. Since the applicator roller 31 rotates faster (two arrows) than the proportioning roller 51, the adhesive film remains on the applicator roller 31. However, the selected thickness of the adhesive coat is deliberately greater than the desired thickness to be applied to the film 1. The excess adhesive can either be removed by an adjustable wiper or by a distributing roller 53 whose speed is adjustable independently. In the case of the adjustable wiper, this is effected by the gap thickness. In the case of the distributing roller it is effected by varying the speed and/or the proportioning distance. Depending on the defined purpose, cleaning wipers can be used on all rollers, e.g. also for laterally limiting the adhesive application. However, it is important that the speed ratio of the applicator roller 31 to the proportioning roller 51 be adjustable independently, as well as the contact pressure or proportioning gap between the applicator roller 31 and the distributing roller 53. Further, it is important for optimal application of adhesive that the contact pressure roller 32 has means..for pressing the contact pressure roller 32 against the applicator roller 31 independently of the "adhesive rollers" (the applicator roller 31, the proportioning roller 51, and the distributing roller 53). The contact pressure roller 32 is preferably not driven by a motor. In this way, each partial function may be optimized independently. The measuring roller 33 is preferably supported on force measuring bearings 55 which are free of displacement. In addition, a regulating device supported by a computer $C_2$ regulates the rotating speed of the applicator roller 31 to a determined preselectable tensioning force Ks of several hundred grams, for example, so that the film can be guided into the laminating means without pulling. The computer $C_2$ can also give the rest of the control commands e.g. for the adhesive proportioning and application station.

FIG. 14 shows the controlled coordination of the main functions, particularly of the feeder 45 or sequence As, the delivery speed V1, the laminating machine 15, and the cutting station 9, which is effected in the example via two computers $C_1$ and $C_2$. The principal function of the computer $C_1$ is to determine the precise sequence As of the feed output of the feeder 45. The corresponding control signal is indicated by JG $S_2$. The sequence As is produced as a function of the processing rate (V1), the sheet length L, the degree of overlapping or underlaying X or a possible sequence with intervals between sheets. Since all of these values are exactly measurable or are determinable physical quantities, electronic computing means (E-C) offer special advantages for this purpose. On the other hand, it has been shown that the actual "handling" of the sheets can be effected substantially more economically according to the invention by purely mechanical means. Proceeding from the computer-controllable base quantities:

the processing rate (V1) and the feeder run (As)

the rest is "dealt with" with surprisingly simple mechanical means M—M. It is possible to use computer $C_2$ as a main computer and to arrange it in the region of the depositing receptacle, for example. $C_2$ is accordingly also the input station for the installation. $C_1$ may be constructed on the same level of convenience as a second main computer or as a subordinate computer. Coordination is essential. However, only one computer can also be used.

Figure 8A:
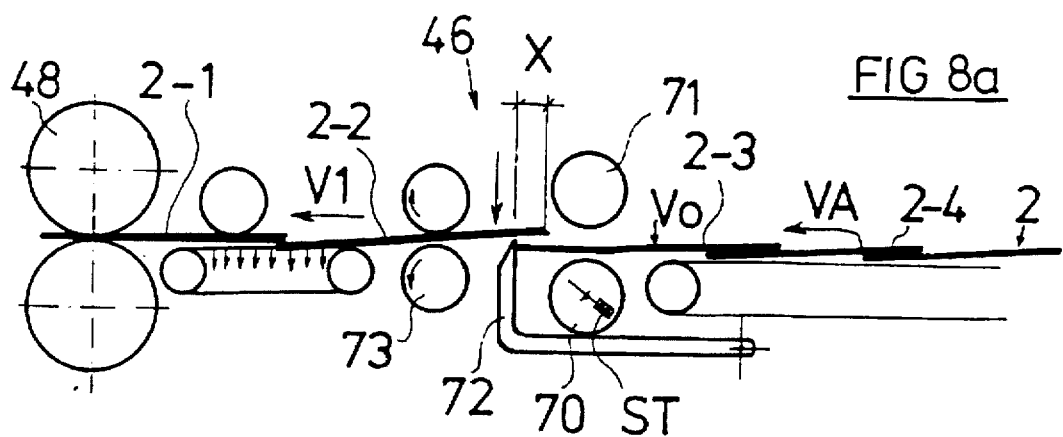
FIG. 8a –8d show various stages of sheet alignment.

FIGS. 8a–8d show different phases of the aligning station 46. An essential part of the aligning station 46 is an accelerating roller 70 with engaging and disengaging clamping rolls 71 and a controllable stop 72. The sheets 2 are fed with a large degree of overlap or underlaying via a conveyor belt 45' from the feeder 45 and slide without hindrance at feed conveying speed VA via the acceleration roller 70 (FIG. 8a). The feed rate VA is substantially lower than the installation speed V1. The aligning station 46 has three principle purposes:

First, each sheet must be accelerated from its original speed VA to the installation speed V1. Secondly, a precise overlapping or underlaying or end-to-end arrangement must be produced. Thirdly, uncomplicated, reliably operating means must be used. There may be no traces of pressing, clamping or friction on the sheets, since this impairs the quality of the laminate. A special difficulty consists in that a) the installation speed V1 is governed by the criteria of the lamination and b) the sheets can have any optional length L, and c) the degree of overlapping or underlaying or, as the case may be, a spacing must be selectable. The sheet sequence adjusted by the aligning station must remain unchanged as far as the laminating station 15.

Figure 8B:
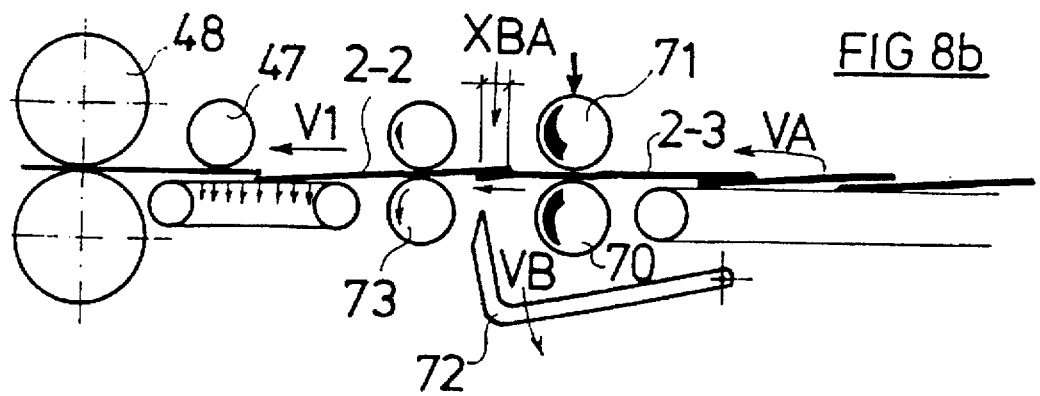
Figure 8C:
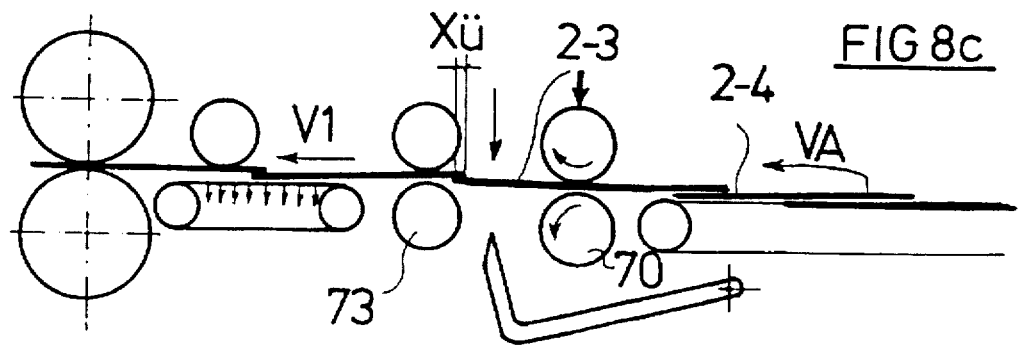
Figure 8D:
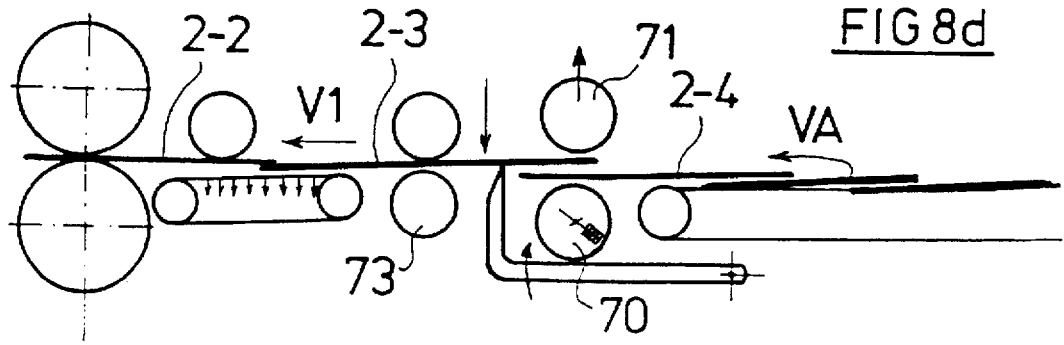

A complete cycle is shown in FIGS. 8a to 8d. In FIG. 8a, the stop 72 remains in the stopping position until a determined underlaying X of sheets 2-2 to 2-3 is adjusted. The accelerating roller is stopped (ST) at this point via a brake coupling. The stop 72 is then folded out. In the meantime, the underlaying XBA decreases as the acceleration of the sheet 2-3 starts (FIG. 8b). The clamping rolls 71 are engaged and pressed lightly against the accelerating rollers 70. An accelerating drive is simultaneously switched on and the sheet 2-3 which has so far remained stationary is accelerated (VB) until the sheet 2-3 has the same speed (V1) as the sheet 2-2. According to FIG. 8c, the accelerating roller 70 now advances the sheet 2-3 until this sheet 2-3 has been detected by a guiding roller pair 73. FIG. 8c shows the end of the acceleration and, at the same time, the status of the preselected overlapping or underlaying Xü which remains unchanged from this point on. The accelerating roller now moves at the same speed as V1. FIG. 8d shows the position in which the sheet 2-3 is completely under the control of the guidance roller pair 73 so that the clamping rolls 71 disengage and the accelerating rollers can be braked. The next sheet 2-4 already travels to the stop 72 which in the meantime has already moved into the stopping position. The process is now repeated corresponding to FIG. 8a.

FIG. 9 shows the basic control functions of the aligning station 46. A computer $C_1$ is connected to an incremental transmitter JG of the adjoining processing installation. Drive means 74, not shown schematically, can drive a feed belt 34' at the speed V1 of the processing installation. The accelerating roller 70 with a mechanical overdrive can be directly connected by means of line 80 with the drives 74 on the processing process side. On the other side, the stop 72, a coupling lever 91 and an engaging and disengaging mechanism 82 for the clamping rolls 71 can be controlled directly via corresponding overdrive means 83 by a drive unit 84 of the feeder 45 or on the feeder side. A common control shaft 85 is provided for all three control functions, three cam disks 86, 87 and 88 being arranged at the latter corresponding to the three functions. The cam disk 86 is in direct engagement with a gripping roll 89, a lever joint 90, and a coupling lever 91 for the coupling 81. The cam disk 87 controls the engaging and disengaging mechanism 82 via a lever 92 and a connecting rod 93. The third cam disk 88 controls a pivot arm 95 of the stop 72 via a lever 94.

FIG. 10 shows the aligning station according to FIG. 3 partially in section and partially according to arrow X—X. The coupling 81 is shown in section. A sliding bush 95 is displaced horizontally via the coupling lever 91 and can be pressed against the accelerating coupling 96 on the left-hand side. The mechanical overdrive 80 is accordingly engaged with the accelerating roller 70. By means of appropriate selection of the slip clutch lining, the leverage of a spring deflection path 99, and the pretensioning or characteristic of a spring system 97, a smooth acceleration is achieved for the accelerating roller and accordingly for the sheets in that a slipping transmission is selected via a selectable rotating path or distance. The clutch has a complementary half which is constructed as a brake coupling 98 and punctually stops the accelerating roller 70 in coordination with the rest of the movements in order to keep the movement of the sheets completely under control. The decelerating time can also be adjusted by adjusting the corresponding spring force of an adjusting spring 97' for the brake coupling. The sliding bush is held in a ready position for braking by means of a spring 97" even when the control unit is switched off.

FIG. 11 shows an enlarged view of the clutch according to FIG. 10.

Figure 12:
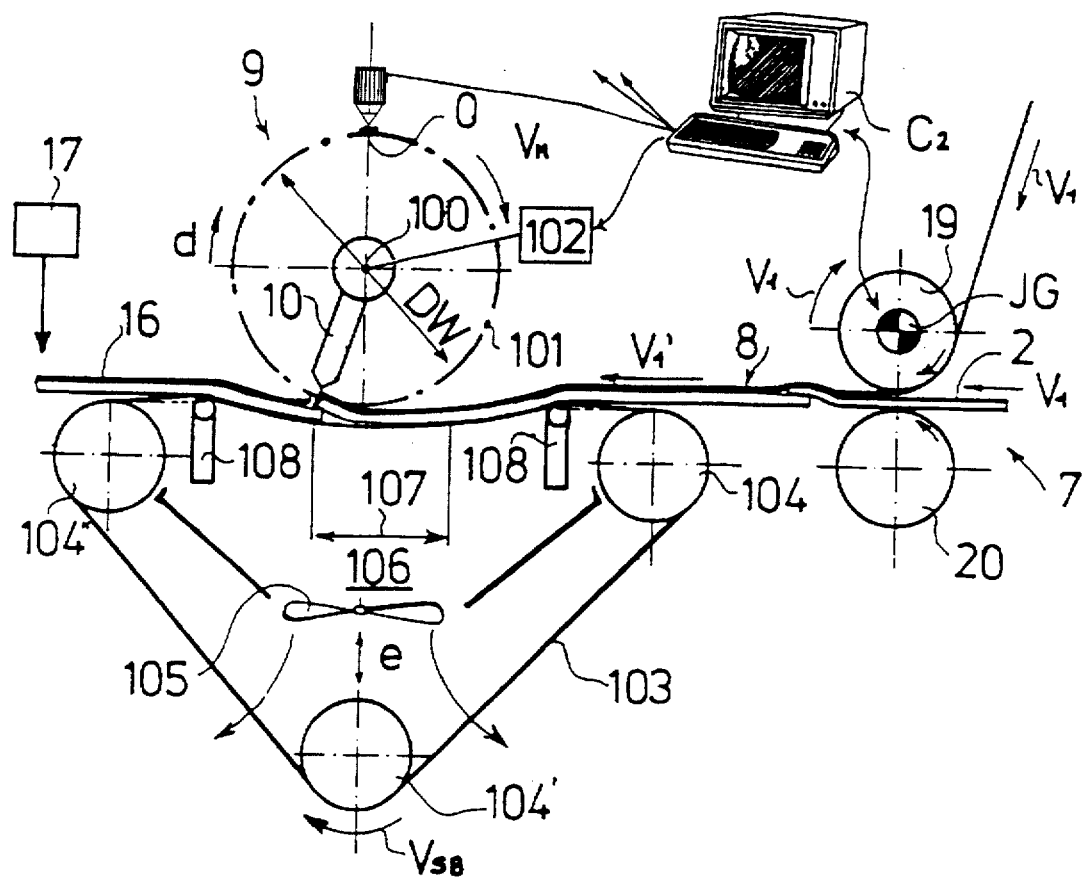
FIG. 12 is a schematic view of a cutting station.

In the following, reference is made to FIG. 12 and 13 which show the lamination and the production of the laminate portions for a wet cutting of the film. The cutting knife 10 executes a rotational movement with respect to a rotational axis 100. The effective circular path of the cutting knife, which can be a thermal cutting knife, known per se, is shown in dashes by a circular line 101. The normal rotating direction 101 is indicated by d, the diameter of the effective circular path 101 is designated by DW. The drive 102 which is shown schematically can be a known construction in itself. The drive 102 must be designed for a very precise and extremely variable speed of the rotating movement of the cutting knife and can be controlled by a computer $C_2$ in a corresponding manner. The laminate moves horizontally from the laminating rollers 7 to a suction belt 103 which runs along at the same speed V1 and is tensioned via three deflecting rolls 104, 104' and 104" with sufficient pretensioning e. A ventilator impeller 105 symbolizes the function of a vacuum pressure for a small chamber 106. The laminate is accordingly not only moved along by the supporting belt 103, but is guided at the same time by a corresponding adhesive force of the suction belt 103 through the cutting station 9. Two support locations 108 and 108' are arranged below the supporting belt 103 outside a region 107 in which the cutting engagement of the cutting knife 10 is effected. The effective cutting path or circular line 101 is slightly lower relative to the undisturbed movement path of the laminate so that the cutting knife 10 presses the laminate downward and heat acts simultaneously with a slight mechanical cutting force.

Figure 13:
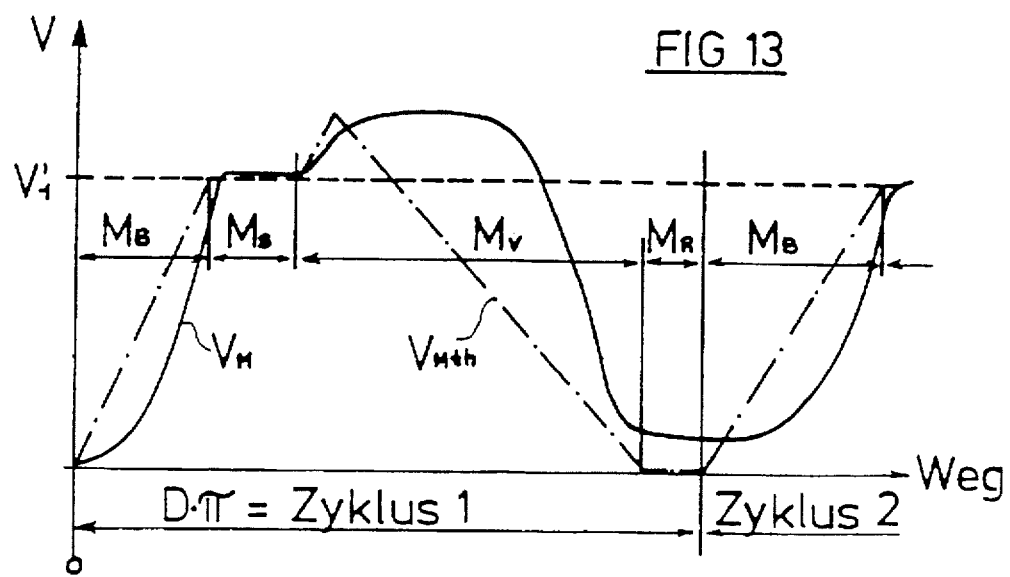
FIG. 13 shows a curve for the speed of the cutting knife over distance.

FIG. 13 is a diagram showing an example of the speed curve of the knife over a rotating movement or over an entire cycle 1. The knife acceleration is designated by MB, the knife cutting contact is designated by Ms, the knife deceleration is designated by Mv, and the knife rest zone is designated by MR. The diagram showing the speed over the distance shows very clearly how the knife is highly accelerated (Vm) to speed V1 prior to cutting. The knife must accordingly be moved along at the same speed as the laminate and then passes into a deceleration phase VMth. In this respect, it is also important not only that the speed curve is controlled during a revolution particularly for the cut, but also that the process is controlled by an incremental transmitter JG, in particular preferably the same as that for controlling the feeder, so that the cutting sequence conforms accurately to the processed sheet length. However, substantially the same variable parameters also occur for cutting. These are, in particular, the installation speed V1 and the sheet length L. The drive is now preferably controlled for the course of the movement via base programs which are adapted by computer to the specific installation speeds and sheet lengths.

While the foregoing description and drawings represent the preferred embodiments of the present invention, it will be obvious to those skilled in the art that various changes and modifications may be made therein without departing from the true spirit and scope of the present invention.

What is claim is:

1. A cutting station for cutting a continuous strip moving in a feed direction comprising:
   (a) a cutter positioned adjacent the strip, said cutter including a movable cutting element;
   (b) a drive operatively connected to said cutter for moving said cutting element into and out of cutting engagement with the strip and during the cutting process moving the cutting element at substantially the same speed as the strip;
   (c) a support belt to flexibly hold the strip relative to the cutting element and to move the strip through the cutting station; and
   (d) a controller for selectively activating said drive.

2. The cutting station as in claim 1, wherein the strip is a thin strip of plastic material, and wherein said cutting element is a thermal knife.

3. The cutting station as in claim 1, wherein the cutter rotates about an axis transverse to the feeding direction of the strip, and wherein said drive is a rotary drive.

4. The cutting station as in claim 3, wherein said rotary drive is a variable speed rotary drive, and wherein said controller controls said driver to accelerate said cutting element into cutting engagement with the strip and to decelerate said cutting element out of cutting engagement with the strip.

5. The cutting station as in claim 1, wherein the tangential velocity of said cutting element is substantially the same as the speed of the strip when said cutting element is moved into cutting engagement with the strip.

6. The cutting station as in claim 1, wherein the strip speed is monitored by an incremental transmitter, and wherein said controller is responsive to signals from said incremental transmitter.

7. The cutting station as in claim 1, wherein said support belt is a vacuum belt.

8. A process for cutting a continuous strip moving in a feed direction comprising the steps of:
   (a) arranging a cutter having a movable cutting element adjacent the strip; and
   (b) selectively driving cutting element into and out of cutting engagement with the strip, the driving step including the steps of cutting the strip during the cutting engagement, controlling the driving of the cutting element to selectively activate the cutter and during the cutting process, moving the cutting element at substantially the same speed as the strip, and flexibly supporting the strip relative to the cutting element and move the strip through the cutting station with a support belt.

9. The cutting process as in claim 8, wherein the cutting assembly is rotatable, and wherein said driving step includes rotating the cutting element into and out of cutting engagement with the strip.

10. The cutting process as in claim 8, wherein the strip is a plastic film and the cutting element is a thermal knife, and wherein the cutting step includes the step of simultaneously pressing and heating the strip with the thermal knife.

11. The cutting process as in claim 8, including the step of monitoring the strip speed by an incremental transmitter, and wherein the step is controlled in response to signals from the incremental transmitter.

12. The cutting process as in claim 8, wherein the cutter is controlled to accelerate the cutting element into cutting engagement and decelerating the cutting element out of cutting engagement.

13. A cutting station for cutting a continuous laminate film strip, the continuous laminate film strip being attached to successive individual sheets, and the continuous laminate film strip and individual sheets moving in a feed direction, comprising:
   (a) a cutter positioned adjacent the continuous laminate film strip and the successive individual sheets, said cutter including a movable cutting element movable in the feed direction;
   (b) a drive operatively connected to said cutter for moving said cutting element into and out of cutting engagement with the continuous laminate film strip so only the film strip is cut and the individual sheets are severed, and during the cutting process moving the cutting element at substantially the same speed as the strip; and
   (c) a controller for selectively activating said drive.

14. The cutting station as in claim 13, wherein the continuous laminate film strip is a thin strip of plastic material, and wherein said cutting element is a thermal knife.

15. The cutting station as in claim 13, wherein the cutter rotates about an axis transverse to the feeding direction of the continuous laminate film strip, and wherein said drive is a rotary drive.

16. The cutting station as in claim 15, wherein said rotary drive is a variable speed rotary drive, and wherein said controller controls said driver to accelerate said cutting element into cutting engagement with the continuous laminate film strip and to decelerate said cutting element out of cutting engagement with the continuous laminate film strip.

17. The cutting station as in claim 13, wherein the tangential velocity of said cutting element is substantially the same as the speed of the continuous laminate film strip and successive individual sheets when said cutting element is moved into cutting engagement with the continuous laminate film strip.

18. The cutting station as in claim 13, wherein the speed of the continuous laminate film strip and individual sheets is monitored by an incremental transmitter, and wherein said controller is responsive to signals from said incremental transmitter.

19. The cutting station as in claim 13, further including an support belt to flexibly hold the continuous laminate film strip and individual sheets relative to the cutting element and to move the continuous laminate film strip and individual sheets through the cutting station.

20. The cutting station as in claim 13, wherein said support belt is a vacuum belt.

21. A process for cutting a continuous laminate film strip, the continuous laminate film strip being attached to successive individual sheets and moving in a feed direction, comprising the steps of:
   (a) arranging a cutter having a movable cutting element movable in the feed direction adjacent the continuous laminate film strip and the individual sheets;
   (b) selectively driving the cutting element into and out of cutting engagement with the continuous laminate film strip, the driving step including the steps of cutting only the continuous laminate film strip, thereby severing the laminate film strip and separating the individual sheets during the cutting engagement, and controlling the driving of the cutting element to selectively activate the cutter; and
   during the cutting process moving the cutting element at substantially the same speed as the continuous laminate film strip and the individual sheets.

22. The cutting process as in claim 21, wherein the cutting assembly rotates about an axis traverse to the feeding direction of the strip and wherein said driving step includes rotating the cutting element into and out of cutting engagement with the continuous laminate film strip.

23. The cutting process as in claim 21, wherein the continuous laminate film strip is a plastic film and the cutting element is a thermal knife, and wherein the cutting step includes the step of simultaneously pressing and heating the continuous laminate film strip with the thermal knife while acting with a light mechanical cutting force.

24. The cutting process as in claim 23, further including the step of flexibly supporting the individual sheets and the continuous laminate film strip against the pressing by the thermal knife.

25. The cutting process as in claim 21, including the step of monitoring the speed of the continuous laminate film strip and the individual sheets by an incremental transmitter, and wherein the step is controlled in response to signals from the incremental transmitter.

26. The cutting process as in claim 21, wherein the cutter is controlled to accelerate the cutting element into cutting engagement and decelerating the cutting element out of cutting engagement.

* * * * *

UNITED STATES PATENT AND TRADEMARK OFFICE
CERTIFICATE OF CORRECTION

PATENT NO. : 5,639,335
DATED : June 17, 1997
INVENTOR(S) : Gerhard ACHILLES, et al.

It is certified that error appears in the above-indentified patent and that said Letters Patent is hereby corrected as shown below:

ABSTRACT, TITLE PAGE, LINE 12, CHANGE "via" to --by--.

Claim 8, col. 15, line 45, change "cutter and" to --cutter,--.

Claim 22, col. 16, line 62, change "traverse" to --transverse--.

Signed and Sealed this

Ninth Day of September, 1997

Attest:

BRUCE LEHMAN

Attesting Officer

Commissioner of Patents and Trademarks